United States Patent [19]

Fischer et al.

[11] 4,248,339
[45] Feb. 3, 1981

[54] GANTRY SCRAPER

[75] Inventors: Gerhard Fischer, Dortmund-Kirchhorde; Gunter Strocker, Holzwickede Krs. Unna, both of Fed. Rep. of Germany

[73] Assignee: Gustav Schade Maschinenfabrik GmbH & Co., Dortmund, Fed. Rep. of Germany

[21] Appl. No.: 20,235

[22] Filed: Mar. 13, 1979

[30] Foreign Application Priority Data

Mar. 16, 1978 [DE] Fed. Rep. of Germany ....... 2811505

[51] Int. Cl.³ .............................................. B65G 65/02
[52] U.S. Cl. .................................... 198/519; 198/511; 198/522; 414/133
[58] Field of Search ....................... 414/133, 305, 313; 198/510, 511, 508, 522, 519, 865, 320; 37/191 R, 191 A, 192 R, 192 A

[56] References Cited

U.S. PATENT DOCUMENTS

3,604,572  9/1971  Strocker et al. ................. 198/511 X
4,026,423  5/1977  Schade et al. ........................ 414/133

Primary Examiner—Robert B. Reeves
Assistant Examiner—Douglas D. Watts
Attorney, Agent, or Firm—Meyer, Tilberry & Body

[57] ABSTRACT

A gantry scraper for the clearing of dumps which can function in closed buildings and can clear substantially the entire area under the scraper. A vertically swingable scraping jib is provided in combination with a tensioned clearing rope or the like which extends upwardly and at an angle to the adjacent beam of the scraper jib, which clearing rope contacts bulk material beyond the end of the jib and knocks the material down to where it is accessible by the jib.

21 Claims, 6 Drawing Figures

Fig. 2.

GANTRY SCRAPER

The invention relates to a gantry scraper for the clearing of dumps or for removing bulk material from a storage pile which has a vertically swingable scraping jib on its movable gantry extending over or spanning the dump, and where the length of the jib is less than the base width of the dump and where on the free end of the jib a clearing device is arranged which attacks the dump outside the swinging range of the jib.

BACKGROUND

Gantry scrapers of various designs are known for the clearing of heaps or dumps which are equipped with at least one swingable scraper jib. The gantry scrapers designed as high-efficiency equipment of modern construction have, in most cases, a scraper jib whose jib-length is approximately the same as the width of the dump, so that the entire cross section of the dump can be swept over with the scraping jib (U.S. Pat. No. 3,557,934). Since the scraping jib protrudes here relatively far beyond the gantry, in the upper swinging range of the jib, these gantry scrapers can, as a rule, not be used in roofed-in dumps or in halls or sheds, respectively, because of lack of space. True enough, there is a possibility to use, instead, gantry scrapers with so-called jointed or buckling jibs which can also clear the waste dumps along its entire cross section, without having the buckling jib protrude beyond the gantry and thus require a sufficiently large free space above the gantry (U.S. Pat. No. 3,814,268). However, such gantry scrapers equipped with buckling or articulated jibs constitute comparatively expensive equipment whose construction costs are also high.

If the gantry scraper is equipped with a rigid scraper jib whose length is smaller than the base width of the dump, the building containing the storage pile or the roof over the dump does not have to be constructed unnecessarily high. However, in this case, the scraper jib cannot sweep over the entire cross section of the dump; consequently, a residual heap remains on the side of the dump which lies opposite the swing pivot of the scraper jib; this residual heap cannot be cleared by the scraper jib. In most instances, the loss of the utilizable cross section is acceptable. However, the disadvantage lies mainly in the fact that most of the bulk materials no longer flow freely after their storage, so that dump-overhangs, i.e. so-called cornices, form in the area of the dump which is beyond the reach of the scraper jib. These cornices can reach considerable heights, particularly if the bulk material is moist and has a tendency to stick. Thus they may cause serious damage to the gantry scraper and its scraper jib if they suddenly collapse. In order to take remedial measures, it is known to equip shed service scrapers with special clearing devices, such as rigid harrows for instance, which clear the bulk material outside the swinging range of the scraping jib. (German AS No. 14 56 778). The known clearing devices are relatively heavy, expensive to construct and require a lot of space.

OBJECTS

It is the object of the invention to equip a gantry scraper, whose scraper jib is shorter than the base width of the dump and which is to be used particularly for roofed-in dumps or storage piles, with a clearing device which distinguishes itself by comparatively simple, inexpensive and easy construction and which can be used to effectively prevent the formation of dump-overhangs or the like in the area of the dumps which is not within the reach of the swingable scraper jib.

THE INVENTION

According to the invention, the clearing device provided for the gantry scraper consists of at least one flexible traction or tension member, such as preferably a clearing rope etc., which is arranged diagonally between the gantry and the free end of the scraper jib and which is kept under tension by means of a tensioning device and which is arranged so as to be adapted to follow the swing motion of the scraper jib while being held under tension.

In the most simple embodiment, only one single clearing rope (or cable) or some other flexible tension member, such as a chain for instance, is provided as a clearing device, and the same is put under tension in an inclined fashion between the free end of the scraper jib and the gantry side located there-adjacent, in such a manner that its cuts through the area of the dump not reached by the scraper jib during the traveling motion of the gantry scraper and during the gradual lowering of the scraper jib and in such a manner that it thus clears the residual heap at least to such an extent that the dangerous dump-overhangs cannot occur. The clearing rope or similar device is arranged between the scraper jib and the gantry in such a manner that it is able to follow the swing motion of the scraper jib, while retaining its tension or stress. Instead of a single clearing rope, two or more clearing ropes or similar flexible traction or tension members may also be provided. It is preferred that the tensioning devices for the clearing rope(s) be arranged on the gantry.

Particularly in the case of heavily sticking or frozen bulk material, it may be advantageous to provide a coupling member for the easily detachable connection of the tension member or members in the vicinity of the free end of the scraper jib. In this instance, the coupling between the clearing device and the scraper jib may be detached in the upper swing range of the scraper jib, so that the scraper jib can swing without taking along the clearing device. Once the scraper jib, while gradually swinging down, reaches a swing position from which the clearing work has to be carried out, the coupling between the clearing device and the free end of the scraper jib can be effected, either by hand or automatically, for instance by hooking the clearing rope into the coupling member of the scraper jib. Coupling devices permitting automatic coupling with the scraping jib and also automatic detachment from the same are known, as such, in the art.

In a preferred embodiment, the tension member or clearing rope, respectively, is deflected or rerouted between its ends via at least one guide or deflection roller arranged on the gantry. If the clearing device consists of several clearing ropes, etc. guided via deflection rollers, it is preferred that the clearing ropes be provided with a common tensioning device. It is, furthermore, advisable to guide the clearing rope(s) in such a manner that the incline of that portion of the clearing rope which carries out the clearing process is at least approximately equal to the angle of repose of the bulk material, over the entire swinging range of the scraper jib at which the clearing device is effective.

According to an additional essential characteristic feature of the invention, a compensating or balancing device may be arranged on the gantry which keeps, at least approximately, constant the incline or operating angle of that portion of the clearing member which effects the clearing process, over the entire working area of the clearing device, without being dependent upon the swing of the scraper jib. The compensating or balancing device consists preferably of a positioning element arranged on the gantry in such a manner that it can be adjusted as to height, which positioning element is provided with at least one guide or deflection roller for the deflection of the clearing rope(s) or the like. For instance, the arrangement may be such that a slide or carriage, guided in guideways of the gantry, is used as a positioning element which is engaged by the tensioning device and which has at least one guide roller for the deflection of the tension member which is fastened with one of its ends to the scraper jib and with its other end to the gantry. However, an arrangement is also possible whereby the tension member guided via the guide roller of the positioning element, is connected with the tensioning device at its gantry-sided end. The positioning element can be arranged at the gantry in such a manner that it is taken along by the down-swinging scraper jib via the tension member against the effective action of the tensioning device. On the other hand, the positioning element may also be adjustable by means of a drive, such as a spindle drive. In this case the positioning element is preferably controlled in dependency of the swing motions of the scraper jib in such a manner that the desired operating angle of the traction or tension member is essentially maintained over the entire area to be cleared.

Figure 1:
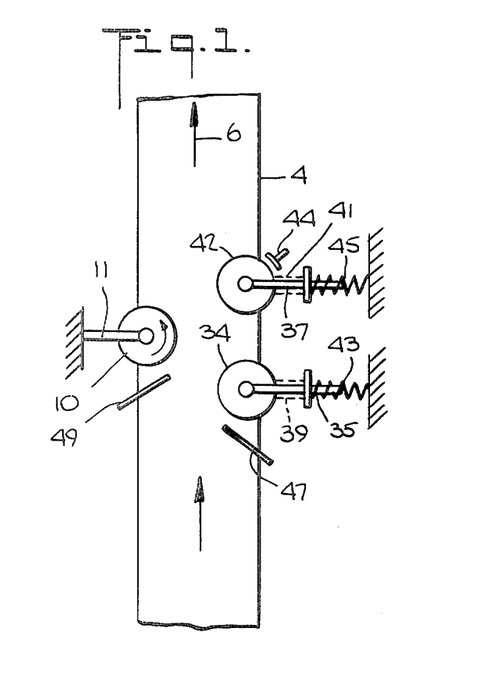
FIG. 1 is a schematic lateral view of a gantry scraper of conventional design which may be equipped with the clearing device according to the invention.
Figure 1A:
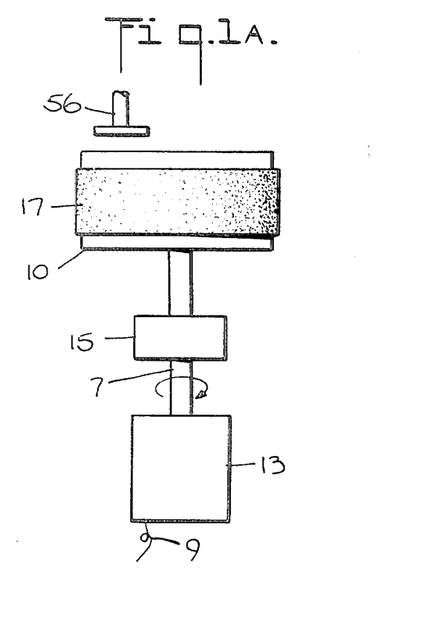

FIG. 1 shows a storage pile or dump 10 of bulk material piled up in a hall or shed 11 and which is to be cleared away with the help of a gantry scraper. The gantry scraper has a gantry 12 extending over or spanning the dump 10, which gantry 12 can be moved in the direction of the axis or length of the dump along tracks 13 mounted on both sides of the dump 10 near the base 21 thereof. The shanks or supports 14 and 15 of the gantry 12 are inclined towards each other and are connected with each other in the apex region 16. Thus, the piled-up dump 10 is tightly embraced by the gantry 12, so that the hall or shed 11 may also have relatively small dimensions.

Located near the base 21 on one side of the gantry on a swing pivot 17 with horizontal articulated axle is a scraper jib 18 which, as is known, can be lifted or swung from the lowered swing position (shown in FIG. 1 by solid lines) to the swing position 18' (indicated by dotted lines). The scraper jib 18 is of known design. As disclosed e.g. by U.S. Pat. No. 3,557,934 it has rakes or scraper elements which are fastened to endless, parallel sprocket-chains which, in turn, extend at both ends of the jib about drive and deflection chain drums or sprocket wheels.

In operation, the gantry scraper 12 moves with continuous speed on the tracks 13 along the dump 10. The scraper jib 18 is lowered or swung towards the side-slope 10' of the dump 10 by means of a winch or hoisting mechanism to such an extent that it scrapes the bulk material along the side-slope 10' of the dump in a downward direction. The bulk material is thereby transferred to a stationary belt conveyor 19 which is located on the base 21 of the dump 10, next to a boundary wall 20 of the dump 10.

FIG. 1 indicates that the length of the scraper jib 18 is smaller or less than the base width of the dump 10. Consequently, a residual heap 10a of the piled bulk material remains on the side of the gantry which lies opposite the swing pivot 17 of the scraper jib 18. This residual heap or dump portion cannot be grasped and cleared away by the scraper jib 18. Generally, the resulting loss of utilizable cross section is acceptable. On the other hand, one must prevent the formation of an overhang 10b (indicated in FIG. 1 by hatching) during the clearing of the dump 10, since the same endangers the gantry scraper if it collapses. In order to eliminate and clear this overhang, the gantry scraper 12 is equipped with a special clearing device, as illustrated in FIGS. 2 to 6.

Figure 2:
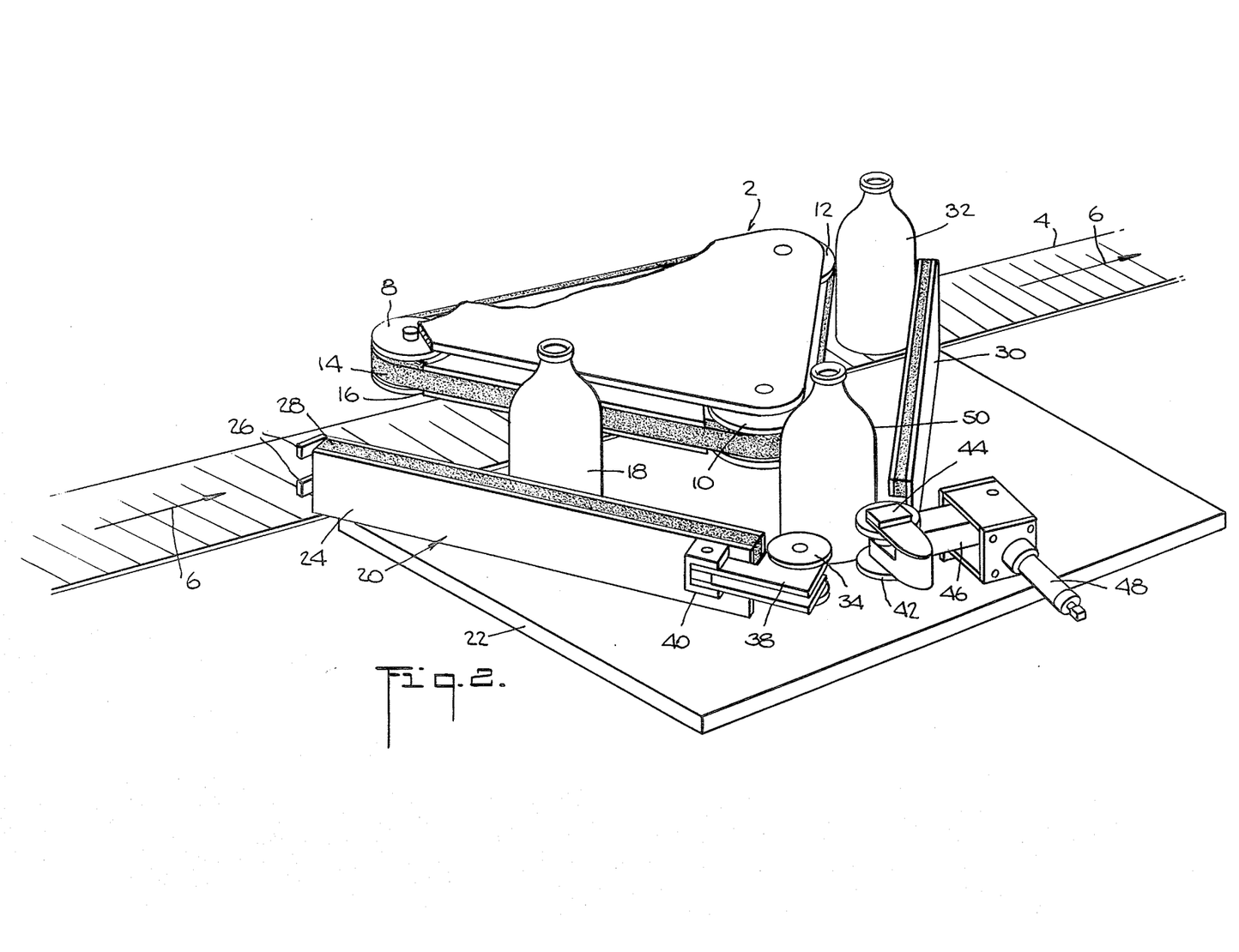
FIG. 2 shows a gantry scraper according to FIG. 1 in a partial-lateral view, in addition to a clearing device according to the invention.
Figure 3:
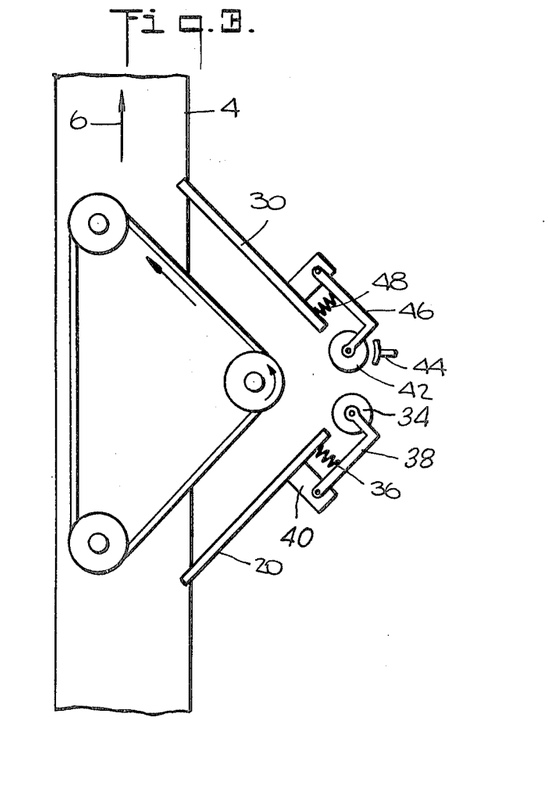
FIG. 3 shows a top view of FIG. 2.

FIGS. 2 and 3 show merely the left side of the gantry with the inclined shank 14, located there, which is raised up above the track or rail 13 via a base piece 22. The scraper jib 18 is in a swing position in which its free jib-end 18" reaches just up to the side-slope 10" of the dump 10. During the subsequent downward swing motion of the scraper jib 18, until it reaches the lowest swing position 18a, indicated by dash-dots, the cross-section portion of the dump 10, marked in FIG. 1 with 10b, is being cleared off by the clearing device comprising the invention. The clearing device provided for this purpose consists of a flexible tension member in the form of a clearing rope, cable, or chain 23, for example, whose end is connected with the scraper jib 18 and its other end with the gantry shank 14 via a tensioning device 24. The scraper jib 18 has, in the vicinity of its free end 18", a laterally located connecting element 25 which is provided with a coupling member 26, in the form of a coupling hook, coupling pin, etc., on which the clearing rope 23 can be hooked up, for instance by means of a loop or eyelet, in a detachable manner. The clearing rope 23 is guided via a deflection or guide roller 27 which is positioned on an upright roller support 28 of the gantry shank 14. The tensioning device 24 which is arranged on the other end of the clearing rope 23 consists, in this embodiment, of a spring device.

As illustrated in FIG. 2, the arrangement is designed in such a manner that, when the scraper jib 18 is swung from the fully drawn or raised swing position 18' to the completely lowered swing position 18a, the clearing rope 23 makes a swing motion about the deflection roller 27, whereby that portion of the clearing rope which does the actual clearing work reaches the position 23' indicated by dotted lines, if the scraper jib 18 is lowered to the very base 21 of the dump 10. The tensioning or spring device 24 is designed in such a manner that the clearing rope 23 is kept taut during the swing motion of the scraper jib 18 and that it can follow this upward and downward swing motion of the jib between the positions 18 and 18a (FIG. 2) thereof.

If the gantry scraper moves along the dump 10 with the jib 18 lowered to the slope 10″ for removing bulk material therefrom, the clearing rope 23 thus moves or cuts through the cross-section area 10b of the dump 10, so that the bulk material is loosened in this area and comes within the operating range of the scraper jib 18, so that it will be grasped by its driven scraper elements and taken along. Just like the scraper jib 18, the portion of the clearing rope 23 doing the actual clearing or cutting work is being gradually lowered, so that the cross-section area 10b of the dump 10 is loosened or broken down by the clearing rope 23 from top to bottom. One can recognize that the portion of the clearing rope 23 which does the actual clearing work is inclined, in each of its working or angular positions, by an acute angle with relation to the vertical and horizontal, whereby the operating angle of the clearing rope is larger in the upper position than in the lower position 23′, in which the scraper jib 18 is completely lowered. It is advisable to arrange the guideway of the clearing rope in such a manner that the incline of the clearing rope is always at least equal to, or preferably greater than, the natural angle of slope that is the angle of repose of bulk material, over the entire working area.

Figure 4:
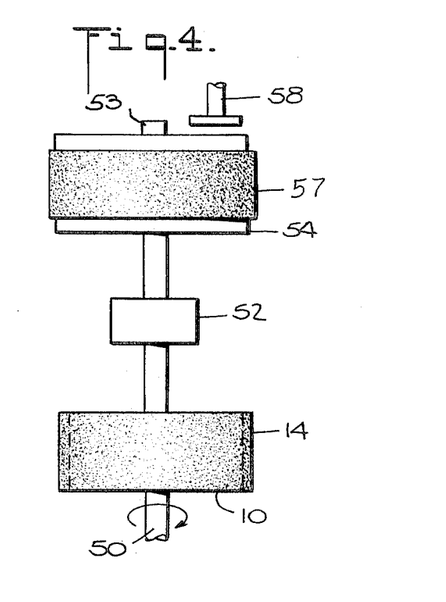
FIG. 4 shows a modified embodiment of a clearing device according to the invention, presented similarly as in FIG. 3.

It is also possible to use other flexible tension members, such as a chain for instance, instead of the clearing rope 23. Furthermore, it is also possible to attach to the clearing rope 23 clearing members, such as teeth, clearing ridges, blades etc., which improve the clearing effect. Instead of just one clearing rope 23, a plurality of clearing ropes or other flexible tension members may also be provided. Such an arrangement is illustrated in FIG. 4. In this embodiment, two parallel clearing ropes 23A and 23B are provided whose one end, in each case, is detachably connected with a coupling member 26 of the scraper jib 18 and whose other end, as shown in FIG. 2, engages, in each case, in a separate or common tensioning device 24. Similar to the embodiment according to FIGS. 2 and 3, the two clearing ropes shown in FIG. 4 are also guided over a guide or deflection roller 27. The two clearing ropes 23A and 23B are interconnected, along their longitudinal portion which effects the actual clearing work, by blades or clearing ridges 29 which are provided with teeth 30. During the clearing operation, the clearing ridges 29 with the clearing teeth 30 are being pulled through the bulk material located in the cross section portion 10b of the dump 10, as a result of which the bulk material is loosened and trickles down within the working range of the scraper jib 18.

It is recommended that the aforedescribed clearing devices are only connected with the scraper jib 18 as the same is being swung over the angular range indicated in FIG. 2 by the dotted line I. If the dump is being cleared by the scraper jib in the cross-section region lying above the line I, the clearing ropes are preferably detached from the scraper jib. During use, they are hooked onto the scraper jib, either by hand or by means of an automatic coupling device, as soon as the scraper jib has been lowered into the swing position shown in FIG. 2, in which its free end 18″ lies within the cross section of the dump.

Figure 5:
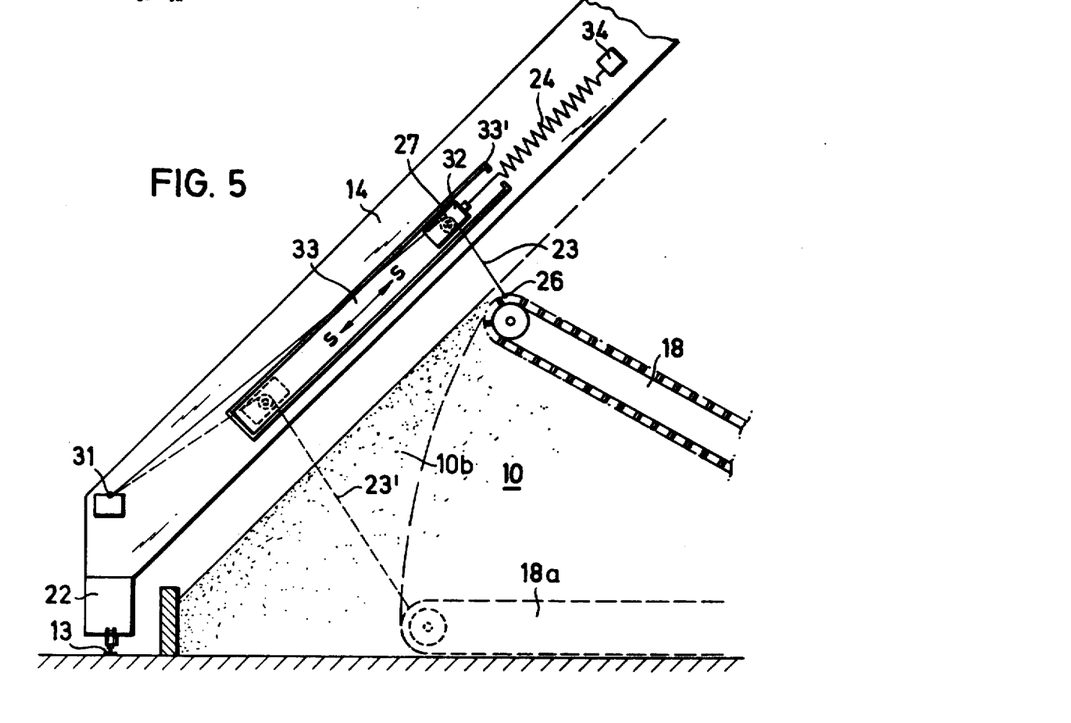
FIGS. 5 and 6 show additional embodiments of a clearing device according to the invention, presented as in FIG. 2.

In the embodiment according to FIG. 5, the clearing rope 23 is at one end detachably connected with the coupling member 26 of the scraper jib 18, as is also the case in the embodiments according to FIGS. 2 to 4. The other end of the clearing rope 23, deflected about the guide roller 27, is anchored in a fixed point 31 of the gantry, which is located at the foot or base portion of the gantry shank 14 above the base piece 22. The guide or deflection roller 27 is positioned on a positioning element 32, designed as a slide, which is displaceably guided, in the direction of the arrows S, in a slide guide 33 of the gantry shank 14. The slide guide 33, which may be designed as a slot guide for instance, is inclined, in relation to the horizontal, by an acute angle of 40° to 50°, for instance. The inclination may correspond with the inclination of the gantry shank 14. The slide 32 is engaged by the tensioning device 24 which consists here, too, of a spring device which is connected with the gantry by a connecting member 34. Since the slide 32 with the guide roller 27 is moved along by the clearing rope 23, when the scraper jib is swung from position 18 to position 18′, and thus travels downward in the slide guide 33 in the direction of the arrow S, a compensation or balancing of the operating angle of the clearing rope results. The portion of the clearing rope which does the actual clearing work by cutting through the dump portion 10b, thus retains its inclination to the horizontal or vertical over the entire range of adjustment, whereby the operating angle is preferably equal to, or greater than, the angle of repose of the bulk material which generally amounts to 40° to 45°. The tensioning device 24 keeps the clearing rope under tension over the entire range of adjustment.

It is obvious that the clearing rope 23, in the embodiment according to FIG. 5, can be equipped with clearing or cutting members, such as teeth, blades, clearing ridges, etc. It is also possible to use several clearing ropes or other flexible tension members which are guided to their anchor point 31 on the gantry via a common slide 32 or via a separate slide, in each case. Instead of the slide 32, another type of positioning element can be provided, such as a traveling carriage equipped with rollers or a pin or bolt, guided in a slot, etc. Instead of the spring device 24, other tensioning devices, such as counterweights for instance, can be used.

Figure 6:
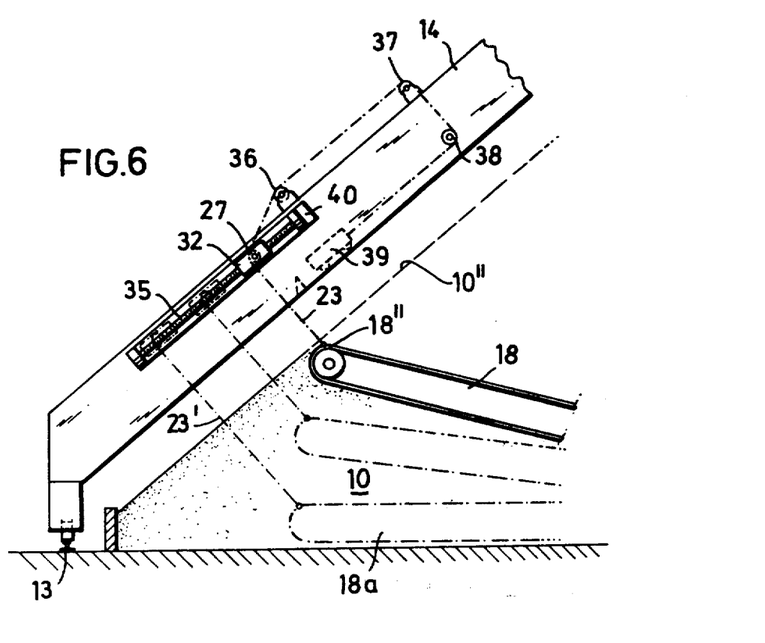

In the embodiment according to FIG. 6, the positioning element 32 is arranged or formed by a spindle nut which is supported on a spindle 35 that forms the inclined guideway corresponding to the slide guide 33. The clearing rope 23 shown here is guided upward by the guide roller 27 of the positioning element 32 and by additional guide rollers 36 to 38, and is connected with a counterweight carriage 39 which forms the tensioning device. The counterweight carriage 39 may run on tracks within the interior of the gantry shank 14. By turning the spindle 35, the nut or positioning element 32 can be adjusted on the same in an upward or downward direction, so that the operating angle of the portion of the clearing rope which does the actual clearing or cutting work and which is located between the scraper jib 18 and the guide roller 27, remains constant, at least approximately, over the entire swinging range, as indicated in FIG. 6 by dotted lines. The spindle 35 can be turned by means of a rotating drive 40, in order to adjust the positioning element 32 in the longitudinal direction of the spindle. The rotation of the spindle may be performed by hand. In this case, the positioning element 32 is moved downward, after each operational travel of the gantry scraper, to such a degree that the aforementioned desired operating angle of the clearing rope 23 is retained, when the scraper jib 18 is stepwise swung down by the depth of cut of its scraper rakes. On the other hand, the spindle drive 40 can also be regulated in dependency of the swing position of the scraper jib 18 in such a manner that the stepwise swinging down of the scraper jib causes the positioning element 32 to gradually move downward on the spindle 35, accordingly.

In the embodiment according to FIG. 6, several clearing ropes 23 or other flexible tension members can be provided. Instead of a counterweight carriage 39, another tensioning device, such as a spring device 24 or a piston-cylinder unit for instance, may be used. Furthermore, it is also possible to arrange clearing teeth, clearing ridges or other clearing members on the clearing rope(s).

In the embodiments of FIGS. 5 and 6, it is possible to adjust the operating angle of the tension member by changing the position and inclination of the slide guide 33, respectively, or shaft 35 to adapt to the respective conditions. In the embodiment shown in FIG. 5, there exists the possibility to adjust the upper end stop 33' of guide 33 to make the necessary adaptation of the clearing rope as required by the respective operations. The positioning device 32, which consists of a carriage or slide, can be pulled in the respective upper position by means of the tension device 24, where the clearing device, which consists at least of one clearance rope 23, can be connected with scraper jib 18 manually or automatically.

The invention has been described with reference to preferred embodiments. Obviously, modifications and alterations will occur to others upon a reading and understanding of the above specification. It is my intention to include all such modifications and alterations insofar as they come within the appended claims:

Having thus described the invention, it is claimed:

1. In a gantry scraper for removing bulk material from a dump having a base, a top and lateral slopes, said gantry scraper including a movable gantry spanning said dump above its top and its lateral slopes and a single, elongated, rigid scraper jib pivotally supported at one end on one side of said gantry at the base of the adjacent one of the said lateral slopes of said dump so as to extend towards the other side of said gantry and being adapted to be swung in a substantially vertical plane with respect to said gantry, said jib having a length from its pivoted end appreciably less than the base width of said dump so that the free other end of said jib terminates appreciably short of the base of the other one of said lateral slopes of the dump, a clearing device arranged adjacent the free end of said jib so as to attack the portion of the dump outside and beyond the reach of the jib swing, said clearing device comprising at least one flexible rope-like tension member connected to the said free end of and actuated by said jib and extending diagonally upwardly and generally endwise therefrom between said free end of said jib and said other side of said gantry to span the distance therebetween, and a tensioning device operatively associated with said tension member for tensioning and maintaining said member taut and for allowing said swinging motion of said jib while carrying along said tensioned member.

2. Improvement according to claim 1, characterized by the fact that a coupling member is provided in the vicinity of said free end of the scraping jib for the easily detachable connection of said tension member to said jib.

3. Improvement according to claim 1, characterized by the fact that the tensioning device is mounted on said gantry.

4. Improvement according to claim 3, characterized by the fact that said tension member is deflected between its ends by at least one deflection roller.

5. Improvement according to claim 1, including clearing members fastened on said tension member.

6. Improvement according to claim 1, characterized by the fact that the clearing device consists of several tension members, each of which is guided via at least one deflection roller and which are connected with a common tensioning device.

7. In a gantry scraper for removing bulk material from a dump having a base, a top and lateral slopes, said gantry scraper including a movable gantry spanning said dump above its top and its lateral slopes and a rigid scraper jib pivotally supported on one side of said gantry so as to extend towards said other side of said gantry and being adapted to be swung in a substantially vertical plane with respect to said gantry, said jib having a length appreciably less than the base width of said dump, a clearing device arranged adjacent the free end of said jib so as to attack the dump outside the jib swing, the improvement which comprises: said clearing device comprising several flexible tension members extending diagonally upwardly between said free end of said jib and said other side of said gantry, a tensioning device for tensioning said members and for allowing said swinging motion of said jib while carrying along said members, and clearing members fastened on said tension members and comprising scraping ridges, said several tension members being connected by said scraping ridges.

8. Improvement according to claim 1, characterized by the fact that over the entire swing of the scraping jib at which the clearing device is effective the operating angle of that portion of the tension member which effects the actual clearing process is at least approximately equal to the natural angle of slope of the bulk material.

9. Improvement according to claim 1, including a compensating device on a gantry shank which keeps, at least approximately, constant the operating angle of that portion of the tension member which effects the clearing process, over the entire working area of the clearing device, without being dependent upon the swing of the scraping jib.

10. In a gantry scraper for removing bulk material from a dump having a base, a top and lateral slopes, said gantry scraper including a movable gantry spanning said dump above its top and its lateral slopes and a rigid scraper jib pivotally supported on one side of said gantry so as to extend towards said other side of said gantry and being adapted to be swung in a substantially vertical plane with respect to said gantry, said jib having a length appreciably less than the base width of said dump, a clearing device arranged adjacent the free end of said jib so as to attack the dump outside the jib swing, the improvement which comprises: said clearing device comprises at least one flexible tension member extending diagonally upwardly between said free end of said jib and said other side of said gantry, a tensioning device for tensioning said member and for allowing said swinging motion of said jib while carrying along said member, and a compensating device on a gantry shank which keeps, at least approximately, constant the operating angle of that portion of the tension member which effects the clearing process, over the entire working area of the clearing device, without being dependent upon the swing of the scraping jib, the said compensating device consisting of a positioning element movably mounted on said gantry so that it can be adjusted as to height, which positioning element is provided with at least one deflection roller for deflecting of the tension member.

11. Improvement according to claim 10, characterized by the fact that the positioning element consists of a carriage or slide, guided in a guideway, which is engaged by the tensioning device and which has at least one deflection roller for the deflection of at least one tension member which is fastened at one of its end to the scraping jib and to the gantry at its other end.

12. Improvement according to claim 10, characterized by the fact that the positioning element is adjustable by means of a mechanical drive.

13. Improvement according to claim 12, characterized by the fact that the drive is controlled by the swinging motion of the scraper jib.

14. Improvement according to claim 12, characterized by the fact that the tension member, which is connected at one of its ends to the scraper jib and guided by the deflection roller of the driven positioning element, is connected with the tensioning device at its other end.

15. Improvement according to claim 10, characterized by the fact that the positioning element is adjustable on an inclined path of motion.

16. Improvement according to claim 1, characterized by the fact that the tensioning device consists of a spring device arranged in the interior of the sloping gantry shank.

17. Improvement according to claim 15, characterized by the fact that the incline and/or the length of the path of motion of the positioning element can be changed.

18. Improvement according to claim 1, wherein said gantry comprises a pair of shanks inclined towards each other and connected with each other above the top of said dump, said scraper jib being pivotally mounted adjacent the base of one of said shanks, whereas said tensioning device for said tension member is arranged on said other inclined shank.

19. In a gantry scraper for removing bulk material from a dump having a base, a top and lateral slopes, said gantry scraper including a movable gantry spanning said dump above its top and its lateral slopes and a rigid scraper jib pivotally supported on one side of said gantry so as to extend towards said other side of said gantry and being adapted to be swung in a substantially vertical plane with respect to said gantry, said jib having a length appreciably less than the base width of said dump, a clearing device arranged adjacent the free end of said jib so as to attack the dump outside the jib swing, the improvement which comprises: said clearing device comprises at least one flexible tension member extending diagonally upwardly between said free end of said jib and said other side of said gantry, and a tensioning device for tensioning said member and for allowing said swinging motion of said jib while carrying along said member, the said tensioning device consisting of a counterweight arranged in the interior of the sloping gantry shank.

20. Improvement according to claim 2, characterized by the fact that the said tension member is connected to the said free end of the scraping jib by said coupling member only during the angular range of the downward swing movement of the jib in which portions of said dump lie outside the reach of the said free end of said jib.

21. Improvement according to claim 12 wherein said mechanical drive comprises a threaded shaft drive.

* * * * *

UNITED STATES PATENT AND TRADEMARK OFFICE
CERTIFICATE OF CORRECTION

PATENT NO.  : 4,248,339
DATED       : February 3, 1981
INVENTOR(S) : Gerhard Fischer et al.

It is certified that error appears in the above—identified patent and that said Letters Patent is hereby corrected as shown below:

The drawings should be cancelled and the attached sheets substituted therefor.

Signed and Sealed this

Twenty-eighth Day of July 1981

[SEAL]

Attest:

Attesting Officer

GERALD J. MOSSINGHOFF

Commissioner of Patents and Trademarks

Patent No. 4,248,339

Patent No. 4,248,339

FIG. 2

FIG. 3

Patent No. 4,248,339

FIG. 4

FIG. 5